US009670940B2

(12) United States Patent
Marger et al.

(10) Patent No.: US 9,670,940 B2
(45) Date of Patent: Jun. 6, 2017

(54) PRESSURE-BALANCE VALVE FOR BALANCING FLUID FEED TO ACTUATOR CYLINDERS OF A SERVO-CONTROL FOR CONTROLLING ROTOR BLADES OF A ROTORCRAFT

(71) Applicant: AIRBUS HELICOPTERS, Marignane (FR)

(72) Inventors: Thibaut Marger, Gignac-la-Nerthe (FR); Arnaud Groll, Salon de Provence (FR); Jean-Romain Bihel, Le Rove (FR); Clement Coic, Aix en Provence (FR)

(73) Assignee: Airbus Helicopters, Marignane (FR)

( * ) Notice: Subject to any disclaimer, the term of this patent is extended or adjusted under 35 U.S.C. 154(b) by 145 days.

(21) Appl. No.: 14/682,327

(22) Filed: Apr. 9, 2015

(65) Prior Publication Data

US 2015/0292527 A1 Oct. 15, 2015

(30) Foreign Application Priority Data

Apr. 11, 2014 (FR) ..................................... 14 00886

(51) Int. Cl.
*F15B 13/02* (2006.01)
*B64C 27/64* (2006.01)
(Continued)

(52) U.S. Cl.
CPC ............ *F15B 13/026* (2013.01); *B64C 27/58* (2013.01); *B64C 27/64* (2013.01); *F15B 11/22* (2013.01);
(Continued)

(58) Field of Classification Search
CPC ......... B64C 13/42; B64C 27/58; B64C 27/64; F15B 11/22; F15B 13/026; F15B 18/00;
(Continued)

(56) References Cited

U.S. PATENT DOCUMENTS 3,543,641 A 12/1970 Deplante
4,128,047 A 12/1978 Caero
(Continued)

FOREIGN PATENT DOCUMENTS

FR 1529793 6/1968
FR 2916492 11/2008
(Continued)

OTHER PUBLICATIONS

French Search Report for FR 1400886, Completed by the French Patent Office on Dec. 12, 2014, 6 Pages.

*Primary Examiner* — Logan Kraft
(74) *Attorney, Agent, or Firm* — Brooks Kushman P.C.

(57) ABSTRACT

A pressure-balance valve for balancing the pressures of fluids admitted into the pressure-balance valve via respective second ducts. The pressure-balance valve has both a chamber for guiding movement in translation of a piston, and also fluid flow paths, each comprising a said second duct and a first duct for admitting a fluid coming from the same fluid source as the fluid flowing in its second duct. Each of the first ducts is provided with a shutter co-operating with a ramp arranged on the piston. Movement of the piston in translation as a result of a pressure difference between the fluids respectively admitted into the second ducts causes one of the shutters to slide along the corresponding ramp and consequently allows additional fluid to be delivered from a first duct to the second duct of the same fluid flow path.

27 Claims, 4 Drawing Sheets

(51) Int. Cl.
*F15B 11/22* (2006.01)
*F15B 18/00* (2006.01)
*B64C 27/58* (2006.01)

(52) U.S. Cl.
CPC ..... *F15B 18/00* (2013.01); *F15B 2211/50572* (2013.01); *F15B 2211/5152* (2013.01); *F15B 2211/5154* (2013.01); *F15B 2211/5155* (2013.01); *F15B 2211/57* (2013.01); *F15B 2211/8757* (2013.01)

(58) Field of Classification Search
CPC .... F15B 2211/50572; F15B 2211/5152; F15B 2211/5155; F15B 2211/5154; F15B 2211/57; F15B 2211/8785; F15B 2211/8757
USPC .......................................................... 91/523
See application file for complete search history.

(56) References Cited

U.S. PATENT DOCUMENTS

| | | | |
|---|---|---|---|
| 4,409,884 | A | 10/1983 | Boehringer |
| 4,825,748 | A | 5/1989 | Sheng |
| 6,178,867 | B1 | 1/2001 | Kovac |
| 7,984,670 | B2 | 7/2011 | Sequera et al. |
| 2005/0132877 | A1 | 6/2005 | Hart |

FOREIGN PATENT DOCUMENTS

| | | | | |
|---|---|---|---|---|
| GB | 2522744 | A | * 8/2015 | ............. B64C 27/64 |
| JP | H04357311 | | 12/1992 | |

* cited by examiner fig.1 fig.6 fig.7 fig.8

PRESSURE-BALANCE VALVE FOR BALANCING FLUID FEED TO ACTUATOR CYLINDERS OF A SERVO-CONTROL FOR CONTROLLING ROTOR BLADES OF A ROTORCRAFT

CROSS REFERENCE TO RELATED APPLICATION

This application claims priority to French patent application No. FR 14 00886 filed on Apr. 11, 2014, the disclosure of which is incorporated in its entirety by reference herein.

BACKGROUND OF THE INVENTION (1) Field of the Invention

The present invention relates to the field of rotary wing aircraft having at least one rotor driven in rotation by a power plant. The present invention relates more particularly to devices for synchronizing the movement of hydraulic members forming parts of the rotorcraft rotors for the purpose of varying the aerodynamic angle of incidence of the airfoils of the blades of such a rotor.

(2) Description of Related Art

Rotorcraft are fitted with at least one main rotor of substantially vertical axis providing the rotorcraft at least with lift. In the specific circumstance of a helicopter, the main rotor also provides the rotorcraft with propulsion and guidance in pitching and in roll.

Rotorcraft are also commonly fitted with at least one anti-torque device such as an auxiliary rotor having a substantially horizontal axis and suitable for providing the rotorcraft with stability and guidance in yaw. Such an auxiliary rotor may for example be a tail rotor, or it may equally well be at least one propulsive propeller in a high-speed helicopter having propellers for forward propulsion.

In order to vary the flight attitude of a rotorcraft, the blades making up the rotary wing of said at least one rotor are mounted so as to be individually hinged to a hub of the rotor so as to pivot about a pitch variation axis that extends substantially along the general extension direction of each blade. A pilot issues flight commands that cause the blades to pivot about their respective pitch variation axes cyclically and/or collectively, thereby causing variation in the aerodynamic angle of incidence of the airfoil of each blade. The pilot may equally well be a human pilot or an autopilot.

The blades of a rotorcraft rotor can be driven to pivot about their pitch variation axes by means of a drive member to which the blades are individually connected via respective pitch variation links.

For example, for a main rotor where it is desired to be able to vary the pitch of the blades cyclically and/or collectively, the member for varying the pitch of the blades is commonly arranged as a pair of plates, commonly referred to as swashplates.

The pair of plates are mounted to move axially along a mast that carries the main rotor and also to tilt relative thereto about a ball joint. Moving the pair of plates axially along the axis in which the rotary wing of the main rotor is driven in rotation causes the pitch of the blades to be varied collectively. Titling the pair of plates about the ball joint causes the pitch of the blades to vary cyclically.

Also by way of example, for an auxiliary rotor, the blade drive member is commonly arranged as an arm or as a plate depending on the number of blades in the auxiliary rotor. The member for varying the pitch of the blades is then mounted to move at least axially along the rotary drive axis of the auxiliary rotary wing in order to cause the pitch of the blades to vary collectively under the effect of the pitch-varying member moving axially.

In this context, the member for varying the pitch of the blades of a rotorcraft rotor about their pitch variation axes is commonly actuated by servo-controls.

Such servo-controls serve to provide a human pilot with assistance concerning the forces that the pilot needs to deliver in order to vary the pitch of blades by acting on a mechanical linkage for transmitting flight control movements resulting from a human pilot operating a flight control member.

Servo-controls may also be controlled by an actuator as a result of flight commands issued by an autopilot or as a function of electrical flight commands issued by a flight control member that is in turn operated by a human pilot.

In this context, aviation leads to a problem of ensuring an aircraft is safe, even in the event of a failure of servo-controls used to drive a member for varying the attitude of the aircraft under the effect of flight commands issued by a pilot. Such an attitude-varying member of an aircraft is constituted in particular by the blades of a rotorcraft as described above or indeed also conventionally by a flight control surface in an airplane.

That is why it is common practice to drive a single attitude-varying member of an aircraft by means of a plurality of servo-controls, each having a single double-acting actuator cylinder or by means of a servo-control having multiple double-acting actuator cylinders. The various servo-controls each having a single actuator cylinder or the various actuator cylinders of a servo-control having multiple actuator cylinders are fed individually with fluid using respective hydraulic circuits from fluid sources that are allocated thereto respectively. These arrangements are such that in the event of a malfunction of one of the hydraulic circuits, at least one other hydraulic circuit can be used on its own to drive the attitude-varying member of the aircraft.

Conventionally, single actuator cylinder servo-controls or the actuator cylinders of a multiple actuator cylinder servo-control are fed individually with fluid from fluid sources that are respectively allocated thereto via hydraulic directional-control valves that are actuated jointly in compliance with flight commands issued by the pilot.

Depending on the flight commands given by the pilot, the hydraulic directional-control valves share the flow of fluids between the various fluid sources and the various chambers of the actuator cylinders. Such hydraulic directional-control valves are frequently incorporated within servo-controls; however they may also be mounted independently on the ducts of the hydraulic circuits connecting the servo-control(s) to the various fluid sources.

Given the small cantilever extension of the member for pivoting blades about their pitch variation axes, it is conventionally preferred in a rotorcraft to make use of a servo-control having a hydraulic actuator with multiple hydraulic cylinders in order to actuate said pitch-varying member.

For information about a technological background close to the present invention, reference may be made for example to Document FR 2 916 492, which describes a servo-control having multiple actuator cylinders and suitable for varying the pitch of blades in a rotorcraft rotor.

There is also a constraint of ensuring that pitch variation is accurately synchronized with the relative movements between the various actuator cylinders and the hydraulic actuator rod that is common to the various actuator cylinders. Such a constraint arises in particular because of the need to maintain complete separation between the hydraulic circuits that are independently feeding each of the actuator cylinders of the servo-control having multiple actuator cylinders.

Document U.S. Pat. No. 3,543,641 or FR 1 529 793 describes an electrohydraulic device for controlling aerodynamic members of airplanes or aerodynes. For each of the controlled members, that device comprises: a hydraulic motor unit having two actuators powered by independent hydraulic circuits, two mechanically coupled-together directional-control valves associated with respective ones of the actuators in order to control the feed of hydraulic fluid thereto, and two receivers of electrical control pulses acting on the directional-control valves. Finally, two switch members associated respectively with the receivers set up or interrupt their connections with the directional-control valves. The two driving hydraulic actuators associated with each of the control members are arranged in tandem. The device has two identical electrical systems for control and servo-control. Each of those systems includes a corresponding receiver and switch on each motor. Switch members are provided so that in the event of one of the control systems operating poorly in service, the other system can automatically take its place. Other switch members are also provided so that in the event of a failure in the second system, the switches of each motor put the associated receivers simultaneously into action at the same time as the receivers are actuated electrically to place the directional-control valves of the two actuators in a position for returning the controlled aerodynamic members to a safe position.

In the context of an airplane, proposals have been made to synchronize the operations of a plurality of servo-controls having single-actuator cylinders that jointly move a control surface by balancing the pressures of the fluids flowing respectively in the end chambers and in the head chambers of the various actuator cylinders.

On this topic, reference may be made for example to Documents U.S. Pat. No. 4,409,884 and U.S. Pat. No. 4,825,748. More particularly according to Document U.S. Pat. No. 4,825,748, a pressure-balance valve balances the respective pressures of the fluids flowing through two servo-controls having single-actuator cylinders that jointly move a control surface. Nevertheless, the organization of the pressure-balance balance valve described in Document U.S. Pat. No. 4,825,748 does not enable the respective hydraulic fluid feed circuits to be rigorously segregated between the two servo-controls.

Other documents have been considered in the context of the invention, namely: JPH04357311, U.S. Pat. No. 4,128,047, U.S. Pat. No. 6,178,867, and US 2005/132877.

Furthermore, still with respect to making rotorcraft safe, the operation of hydraulic members making up hydraulic installations dedicated to varying the pitch of blades needs to be checked regularly. Furthermore, it is desirable to warn a rotorcraft pilot in flight of a malfunction of such hydraulic installations that might be a source of danger.

That is why, in order to limit the frequency with which said hydraulic installations are subjected to checking and maintenance operations, and in order to provide the pilot with information in the event of malfunction, there is a constant search for ways of integrating devices that detect malfunction in said hydraulic members.

More particularly, specifically for servo-controls, malfunction is potentially due to a dormant failure in a hydraulic member controlling their operation, such as in at least one of said hydraulic directional-control valves, for example. It should be recalled that a failure is commonly said to be "dormant" in the event of said failure not being detected. Consequently, it would appear to be appropriate to detect such dormant failures better in order to preserve the servo-control and avoid it malfunctioning, or indeed to anticipate dealing with such a potential malfunction.

Nevertheless, systems for detecting how a hydraulic member is functioning are bulky, and incorporating them in said hydraulic member is often difficult to achieve. It should be observed that the servo-controls for varying the pitch of the blades of a rotorcraft rotor are placed in a hostile environment that is already crowded with equipment, thereby making it even more difficult to install a device for detecting a failure in the operation of such servo-controls.

As a result, in practice, dormant failures in the set of hydraulic members located in the fluid feed circuits of servo-controls are often difficult to detect, and instead regular checks are performed on the operation of servo-controls. On this topic, reference may be made by way of example to above-mentioned Document FR 2 916 492, which discloses a system for detecting a malfunction of the servo-control described in that document.

In the event of a malfunction of a servo-control being detected, a search is made for the cause of such a malfunction by acting during a maintenance operation to verify all of the hydraulic members in the various hydraulic circuits serving to feed fluids respectively to the various actuator cylinders of the servo-control.

BRIEF SUMMARY OF THE INVENTION

In this context, an object of the present invention is to provide a pressure-balance valve for balancing the pressures among the various fluids flowing respectively within the various actuator cylinders of at least one servo-control suitable for moving an aircraft flight attitude control member, such as the blades of a rotorcraft rotor or a control surface of an airplane.

It should naturally be understood that the various actuator cylinders may equally well be actuator cylinders of a servo-control having multiple actuator cylinders, or respective actuator cylinders of a plurality of servo-controls each having a single actuator cylinder.

The pressure-balance valve of the present invention is desired more particularly to be suitable for use in the context of varying the flight attitude of a rotorcraft by varying the pitch of the blades of at least one rotorcraft rotor about their respective pitch variation axes by means of a servo-control having multiple actuator cylinders actuating a member for pivoting the blades.

The present invention seeks more particularly to propose such a pressure-balance valve in the context of maintaining strict separation between the various hydraulic fluids respectively feeding distinct fluids to the various actuator cylinders, where such strict separation ensures rigorously that there is no mixing together of the fluids.

The present invention also seeks more particularly to provide such a pressure-balance valve of architecture that makes it easy to incorporate means for checking the operation of said at least one servo-control by detecting operation of the pressure-balance valve.

It is also desired to provide such a pressure-balance valve that is simple in structure, easy to maintain, and of architecture that makes it possible to limit as much as possible its own conditions of wear, of fatigue, and of deterioration in use. In the context of such a search, the moving members of the pressure-balance valve should be as few as possible in number.

Such a restriction on the number of moving members comes within the context of seeking to ensure that the pressure-balance valve is reliable in operation by limiting factors that might lead to it deteriorating and by avoiding rapid wear in the valve as a result of the repeated movements to which said moving members are typically subjected. It should be observed that the pressure-balance valve of the invention is to be located on board a rotorcraft in the proximity of said rotor, i.e. in an environment that is hostile, and in particular in an environment that is subjected to high levels of vibration.

In this context, the present invention also seeks to provide such a pressure-balance valve that balances the pressures of said fluids, while avoiding as well as possible any sudden variation in fluid pressures and while avoiding as well as possible any violent moves of said moving members in order to protect them and limit potential causes of malfunction of the pressure-balance valve.

The pressure-balance valve of the present invention is a valve for balancing pressures of various fluids flowing respectively within a plurality of double-acting actuator cylinders of at least one servo-control suitable for operating a member for varying attitude in flight of an aircraft.

The pressure-balance valve of the present invention suitable for such an operating context includes a valve cylinder comprising at least:

a chamber for guiding a piston to move in translation along an axial extension direction of the chamber;

two first ducts opening out into the chamber and each serving to convey a flow of a respective fluid between the outside and the inside of the valve;

two passages for individually conveying said fluids into the inside of the valve respectively between the first ducts and the second ducts, each opening into the chamber and serving to convey a flow of a respective fluid between the outside and the inside of the valve; and at least one bleed duct for the draining fluids admitted into the inside of the chamber.

In accordance with such an architecture for the valve, each fluid flow path of the pressure-balance valve for conveying a respective fluid includes distinctly at least a said first duct, a said passage, and a said second duct placed mutually in fluid flow communication. The axial position of the piston inside the chamber is conventionally controlled under the effect of opposing thrusts exerted respectively by the fluids on the axially opposite end faces of the piston, with the piston being caused to move axially under the effect of a pressure difference between the respective fluids admitted into the second ducts.

The position of the piston inside the chamber is typically stabilized by balance between said opposing thrusts resulting from balance between the respective pressures of the fluids in the respective fluid flow paths. An unbalance between said opposing thrusts causes the piston to move axially away from its stabilized position, and consequently causes fluid to be admitted into the inside of the pressure-balance valve from one of the ducts in one of the fluid flow paths, thereby reestablishing balance between said opposing thrusts.

In such a context, the valve of the present invention is mainly recognizable in that for each of said fluid flow paths, the first duct is provided at its outlet to the chamber with a movable shutter that co-operates with a ramp formed on the piston.

Sliding of the shutter along the ramp caused under the effect of the piston moving in translation inside the chamber disengages the outlet of the first duct and consequently places the first duct and the second duct in fluid flow communication with each other via said passage.

The first and second ducts in fluid flow communication with each other deliver additional fluid through the passage from the first duct to the second duct. Said additional fluid then balances the pressures of the fluids flowing respectively through the fluid flow paths.

Such provisions make it possible to organize the pressure-balance valve with an architecture that is simple and completely safe in terms of strict separation between the fluid flow paths preventing any mixture of the various fluids, and this is achieved while limiting the number of moving parts and in particular while avoiding the conventional use of elastically deformable members which are known for suffering from fatigue under the effects of repeated deformation.

More particularly, the ramps may advantageously be provided at the respective axial ends of the piston, and the passages may be provided at the respective axial ends of the chamber. The first duct and the second duct of a given fluid flow path can easily open out into an axial end of the chamber associated therewith, thereby forming a said passage.

As described below, such simplicity in the structure of the pressure-balance valve makes it possible:

to organize fluid flow paths that are arranged in valve cylinder blocks that are structurally distinct and assembled together axially, with the particular advantage of avoiding propagation of cracks, if any, between the valve cylinder portions housing the respective fluid flow paths;

to incorporate easily in the valve devices for indicting malfunction of the valve, and/or of the actuator cylinders, without excessively complicating the structural organization of the valve;

to provide brake means and hydraulic damper means acting on the movement of the piston, enabling the movement of the piston to be stabilized and in particular avoiding sudden movements of the piston and/or unwanted movements of the piston that might be caused under the effect of the high levels of vibration to which the valve is subjected; and to arrange the bleed duct in the valve cylinder in such a manner as to be isolated by sealing means from each of the fluid flow paths arranged at the axial ends of the chamber, without excessively complicating the structural organization of the valve.

Isolating said at least one bleed duct enables it to be arranged as a single drain that collects the fluid residues that result from fluids infiltrating past the sealing means and discharges them to the surrounding atmosphere outside the valve. Such fluid residues may be lost without it being necessary for them to be reinserted into the hydraulic circuits through which the fluids flow between the respective fluid sources and the servo-control(s), thereby preserving strict segregation between the fluids.

More particularly, in an embodiment of the invention and considering each of said fluid flow paths separately, the passage may advantageously be formed by an axial end segment of the chamber into which the first and second ducts open out.

Naturally, in order to prevent any mixing between the fluids, the axial end segments of the chamber associated with respective ones of the fluid flow paths are isolated against any fluid flow communication between them. Such isolation of the axial end segments of the chamber may advantageously be provided by said sealing means and by the drain discharging said potential fluid residues out from the pressure-balance valve into the surrounding atmosphere, where such residues may potentially come from either of the respective passages of the fluid flow paths.

In an advantageous embodiment, the pressure-balance valve body is subdivided into two valve cylinder blocks that are axially assembled together.

Said blocks provide the respective fluid flow paths by including respective chamber segments on a common axis. In addition, the piston is subdivided into two structurally distinct piston segments, the piston segments being housed respectively in the chamber segments and bearing axially one against the other.

The structural distinction between the two blocks makes it possible to preserve the valve from cracks propagating in the valve cylinder between the two blocks. Such cracks may result in particular from external stresses to which the valve is subjected, and more particularly they may result from the vibration to which the valve is subjected because it is located in the proximity of the rotor, in an environment that is known to be hostile and that is subjected to high levels of vibration.

Still more particularly, in an embodiment of the invention, said at least one bleed duct is arranged as a drain isolated from the fluid flow paths by sealing means interposed between the piston and the chamber. The bleed duct collects lost fluid and discharges it from the valve, which lost fluid comes from any residue of at least one of the flcantileveruids that has infiltrated past the sealing means.

Preferably, the bleed duct is common to collecting and discharging lost fluid coming from either of the fluids, opening out in particular to a middle axial zone of the chamber.

The sealing means are suitable for being implemented merely by a pair of gaskets, e.g. lip gaskets. More particularly, the sealing means comprise gaskets interposed axially between the bleed duct and respective axial ends of the chamber.

Arranging the bleed duct as a drain makes it easy to fit the valve with a device for providing a warning of malfunction of the valve or indeed of the hydraulic installation including at least one pressure-balance valve of the invention. Specifically, such a device for providing a warning of malfunction at least of the valve may advantageously be formed by means for evaluating the quantity of lost fluid discharged from the bleed duct.

In an advantageous embodiment, and as mentioned above, the pressure-balance valve may be provided with hydraulic damper means and/or brake means acting on the movement of the piston inside the chamber.

The hydraulic damper means may be simple structures involving co-operation between sockets formed in the chamber end walls and respective axial extensions of the piston or of the piston segments that the sockets are suitable for receiving.

Such provisions provide damping of movement of the piston, since the fluid present in the sockets opposes thrust against the extensions traveling inside the sockets as a result of the piston moving axially inside the chamber.

Naturally, the amplitude of such opposing thrust may be adjusted by the difference between the respective volumes of the extensions and of the sockets, and more particularly by the dimensions of clearance left between the co-operating sockets and extensions, said clearance forming a channel for discharging fluid from the sockets into the chamber as a result of the extensions moving inside the sockets.

More particularly, the pressure-balance valve advantageously has hydraulic damper means for damping the movement of the piston inside the chamber.

Hydraulic damping of axial movement of the piston is advantageously obtained while avoiding the use of any members that are subjected to fatigue, such as an elastically deformable member, for example, and by taking advantage of the fluids that flow inside the pressure-balance valve in order to achieve damping of the movement of the piston inside the chamber.

More particularly, the hydraulic damper means are advantageously formed by blind sockets opening out into respective end walls of the axial ends of the chamber and co-operating with respective axial extensions of the piston. The sockets receive respective ones of said extensions as a result of the piston moving axially inside the chamber.

Clearance arranged respectively between each socket and the extension co-operating therewith leaves controlled discharge channels for discharging the fluids from the sockets to the chamber, naturally as a result of the extensions that co-operate with the respective sockets traveling inside the sockets.

Preferably, when the piston is in a stabilized axial position inside the chamber under the effect of balanced thrusts exerted on the axial end faces of the piston by each of the fluids respectively, axial gaps are left between the shutters and the respective ramps with which the shutters co-operate.

Said axial gap ensures that a certain amount of pressure difference can be accepted between the respective fluids admitted into the second ducts, while serving to ensure that no fluid can pass from the first ducts to the chamber when the piston is substantially in its stabilized position. Furthermore, given the high levels of vibration to which the pressure-balance valve is subjected, this avoids unwanted admissions of the fluids into the chamber from the first ducts under the effect of movements of the piston caused by such vibrations.

In this context, the pressure-balance valve preferably includes braking means for braking the movement of the piston inside the chamber. Such provisions serve to protect the valve from premature wear and they contribute to avoiding any such unwanted admissions of fluids into the chamber under the effect of the vibration to which the valve is subjected.

In addition, in compliance with the simple architecture of the pressure-balance valve of the invention, said brake means may advantageously be formed by at least one of the following arrangements that are easy to implement:

the ramps have slopes at an angle relative to the extension axis of the piston lying in the range 5° to 60°; and sealing means are mounted so that they are a tight fit along the piston under the effect of the piston moving axially.

It should be observed that a first warning device for providing warning of malfunction of the pressure-balance valve can easily be formed by means for evaluating the quantity of lost fluid that has been discharged from the bleed duct, where this fluid indicates a loss of effectiveness in the sealing means and possibly also indicates softening of the sealing means that might affect the braking of the piston.

Furthermore, the pressure-balance valve may be provided with a second warning device for warning of malfunction of the valve, which device is advantageously formed by detector means for detecting the position of the piston inside the chamber. Such detector means may serve in particular to generate a warning signal in the event of detecting that the piston has moved through an axial stroke longer than a predefined acceptable stroke.

Said detector means preferably generate a variation in said warning signal as a function of the axial position of the piston inside the chamber.

More particularly, in an embodiment of the invention that is easily implemented because of the simplicity of the architecture of the valve, said detector means are advantageously formed by at least one set of components co-operating by means of waves, e.g. by exchanging radiofrequency waves and/or by making use of magnetic waves.

Said detector means comprise in particular at least a first component placed at an axial end of the piston that is associated therewith and a second component placed at the end of the chamber facing said any axial end of the piston.

In accordance with such provisions, said at least one first component may be placed equally well at either axial end face of the piston or on either of said extensions.

For example, the detector means are of the type that make use of the Hall effect. The first component and the second component are formed by magnets that generate between them a magnetic field that is crossed by a third component mounted on the cylinder of the valve and producing a voltage that generates said warning signal at a predefined setpoint voltage.

The shutters respectively occupying the first ducts are constituted in particular surfaces of revolution, such as for example: spherical caps, spheres, or cones. In particular, the ramps are provided at the respective ends of the piston, e.g. being conical in shape.

In a preferred embodiment, each of the first ducts is provided with a perforated seat for retaining the shutter with which it is associated against the shutter escaping to the inside of the first duct.

Such an escape may potentially be caused under the effect of thrust exerted by the fluid present in the chamber in the event of the pressure of the fluid present in the chamber being excessive compared with the fluid flowing in the first duct.

These provisions are such that an escape of the shutter towards the perforated seat prevents fluid passing from the first duct towards the chamber in the event of excess pressure of the fluid present in the chamber. When the pressure of the fluid present in the chamber becomes lower than the pressure of the fluid admitted into the first duct, then the shutter is put back by the fluid admitted into the first duct towards the outlet of the first duct into the chamber.

Furthermore, the simplicity of the architecture of the pressure-balance valve makes it easy to install means for monitoring its operation prior to putting it into service. More particularly, in an embodiment of the invention, the valve is provided with control means for controlling axial movement of the piston prior to admitting fluids into the inside of the valve and consequently, where appropriate, means for checking the operation of the means for detecting the axial position of the piston inside the chamber.

The piston is preferably subdivided into two piston segments on a common axis bearing axially one against the other, said control means may advantageously be formed by an elastically deformable member interposed axially between the piston segments and urging the piston segments towards the axial ends of the chamber respectively facing said piston segments.

It should naturally be understood that said elastically deformable member is used prior to putting the pressure-balance valve into service and feeding it with fluid, with said member not being involved in the operation of the valve while it is in use.

Said elastically deformable member is used prior to installing the pressure-balance valve in the hydraulic circuit with which it is associated and/or at least prior to admitting fluid into the inside of the valve.

Furthermore, it should be observed that subdividing the piston into two piston segments and subdividing the valve cylinder into two valve cylinder blocks makes it easier to assemble together the components of the valve, and makes it easy to arrange the bleed duct within the valve cylinder.

The present invention also provides a hydraulic installation appropriate for moving a member for varying flight attitude of an aircraft, and more particularly a member dedicated to varying the pitch of rotor blades in a rotorcraft.

The hydraulic installation of the present invention comprises in particular two distinct hydraulic circuits that prevent communication between respective fluids conveyed by the hydraulic circuits between respective fluid sources for said fluids and respective double-acting actuator cylinders of at least one servo-control suitable for driving said member for varying flight attitude of the aircraft.

Furthermore, each hydraulic circuit has a hydraulic directional-control valve controlling the flow of fluid through an end chamber and through a head chamber of an actuator cylinder that is fed with fluid under the control of the hydraulic directional-control valve of a given hydraulic circuit. The hydraulic directional-control valves are jointly actuatable under the effect of commands issued by a pilot of the aircraft, where the pilot may equally well be a human pilot or an autopilot, so as to control simultaneously the flow of the various fluids respectively within the various actuator cylinders.

These provisions are such that a first hydraulic circuit conveys a first fluid between a first fluid source and a first actuator cylinder via a first chamber directional-control valve.

As a result of using the first hydraulic directional-control valve, the first fluid flows through the first hydraulic circuit between firstly the source of the first fluid and secondly an end chamber and a head chamber of the first actuator cylinder. Hydraulic channels of the first hydraulic circuit are used for passing the flow of the first fluid between the first fluid source and respectively the end chamber and the head chamber of the first actuator cylinder.

Likewise, a second hydraulic circuit, distinct from the first hydraulic circuit, conveys a second fluid between a second fluid source and a second actuator cylinder via a second hydraulic directional-control valve.

As a result of the second hydraulic directional-control valve being operated jointly with operating the first hydraulic directional-control valve, the second fluid flows through the second hydraulic circuit between secondly the source of the second fluid and secondly an end chamber and a head chamber of the second actuator cylinder. Hydraulic channels of the second hydraulic circuit are used for passing the flow of the second fluid between the second fluid source and respectively the end chamber and the head chamber of the second actuator cylinder.

According to the present invention, such a hydraulic installation is mainly recognizable in that it is provided with pressure-balance valves as described above.

A first pressure-balance valve balances the respective pressures of the fluids flowing through the respective end chambers of each of the actuator cylinders. A second pressure-balance valve balances the respective pressures of the fluids flowing through the respective head chambers of each of the actuator cylinders.

More particularly, the first ducts of each of the pressure-balance valves are in fluid flow communication upstream from the hydraulic directional-control valves with the respective fluid sources. The second ducts of each of the pressure-balance valves are in fluid flow communication downstream from the hydraulic directional-control valves, for a first pressure-balance valve with the respective end chambers of the actuator cylinders, and for a second pressure-balance valve with the respective head chambers of the actuator cylinders.

The concepts "upstream" and "downstream" are considered relative to the flow direction of the fluids from the fluid sources to the actuator cylinders.

Furthermore, each of the pressure-balance valves opens out to the surrounding air via said at least one bleed duct with which each of the pressure-balance valves is provided. More particularly, for each of the pressure-balance valves, the chamber is advantageously connected to the surrounding atmosphere via said at least one bleed duct arranged as a drain and isolated from the fluid flow paths of the pressure-balance valve, e.g. by sealing means arranged between said at least one bleed duct and said fluid flow paths.

In an advantageous embodiment, the lost fluid collected and discharged by said at least one bleed duct of each of the pressure-balance valves is collected in a common storage volume advantageously provided with means for evaluating the quantity of lost fluid that has been collected by the storage volume.

Said storage volume preferably collects the lost fluid drained by the respective bleed ducts of each of the pressure-balance valves. Said evaluation means may for example be means for viewing the inside of the storage volume or detector means including sensors for measuring the volume of lost fluid collected in the storage volume.

As mentioned above, the actuator cylinders may equally well be actuator cylinders incorporated in a servo-control having multiple actuator cylinders or actuator cylinders incorporated in servo-controls having respective single actuator cylinders.

The invention also provides a rotary wing aircraft including at least: a pressure-balance valve of the above-described type and/or a hydraulic installation of the above-described type.

BRIEF DESCRIPTION OF THE SEVERAL VIEWS OF THE DRAWINGS

Embodiments of the present invention are described with reference to the figures of the accompanying sheets, in which.

DETAILED DESCRIPTION OF THE INVENTION

For a better understanding of the explanations below, members that are common and shown in various figures are respectively identified in the description relating specifically to those figures using the same reference numbers and/or letters, but without that meaning that they are shown individually in each of the figures.

Figure 1:
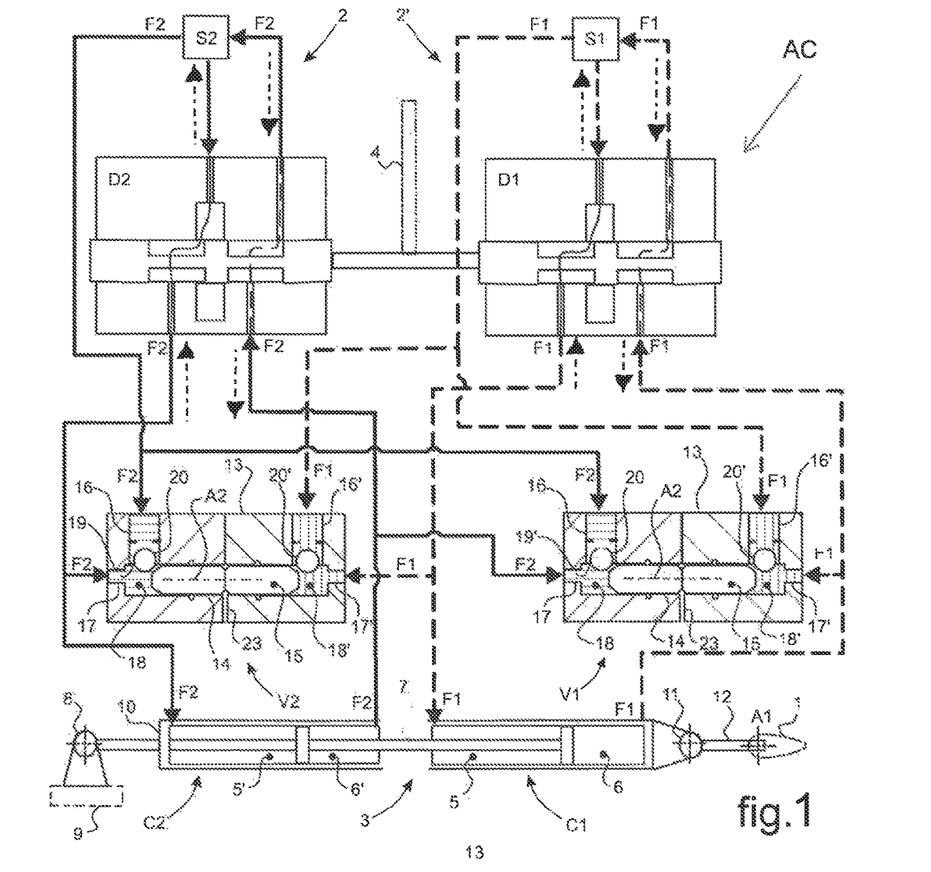
FIG. 1 shows an example of architecture for a hydraulic installation of the present invention.

In FIG. 1, a hydraulic installation is dedicated to pivotally moving the blades 1 of a rotary wing aircraft AC. In this example, the rotary wing aircraft AC is a rotorcraft having blades 1 that pivot about their respective pitch variation axes A1.

Conventionally, such a hydraulic installation comprises two distinct hydraulic circuits 2 and 2' causing respective fluids F1 and F2 to flow between fluid sources S1 and S2 associated with respective ones of the hydraulic circuits 2 and 2', and respective actuator cylinders C1 and C2 of a servo-control 3.

The hydraulic installation also typically includes hydraulic directional-control valves D1 and D2 each placed in fluid flow communication with one or the other of the hydraulic circuits 2 and 2'. The hydraulic directional-control valves D1 and D2 are operable jointly by a common control member 4 actuated in compliance with flight commands issued by a pilot, which may equally well be a human pilot or an autopilot.

In the embodiment shown, the hydraulic directional-control valves D1 and D2 are of the type having at least one slide and preferably of the safe type having two slides. Naturally, the hydraulic directional-control valves D1 and D2 may be of any other structure that provides at least the same functions, such as hydraulic directional-control valves arranged as rotary valves, for example.

The hydraulic directional-control valves D1 and D2 distribute the combined flow of the fluids F1 and F2 through each of the hydraulic circuits 2 and 2' in order to feed fluid selectively to the end chambers 5, 5' and to the head chambers 6, 6' of the various actuator cylinders C1, C2 with which the hydraulic directional-control valves are respectively associated. Relative movement between the actuator cylinders C1, C2 and a rod 7 slidably mounted inside the actuator cylinders C1 and C2 serves to vary the pitch of the blades 1 of the rotor.

In the embodiment shown, these actuator cylinders C1, C2 are incorporated in a single hydraulic actuator 10 having two actuator cylinders C1, C2 of the servo-control 3. The actuator cylinders C1 and C2 co-operate jointly with a common rod 7 having anchor means 8 for anchoring to a structure 9 of the rotorcraft, with the hydraulic actuator 10 being provided with fastener means 11 for fastening to a drive member 12 for driving the blades 1 about their respective pitch variation axes A1.

In a possible variant embodiment providing the same relative movement between the actuator cylinders C1, C2 and the rod 7, the hydraulic actuator 10 could be provided conversely with anchor means for anchoring to the structure of the rotorcraft, while the rod 7 could be provided with fastener means for fastening to the drive member 12 of a blade 1.

Figure 8:
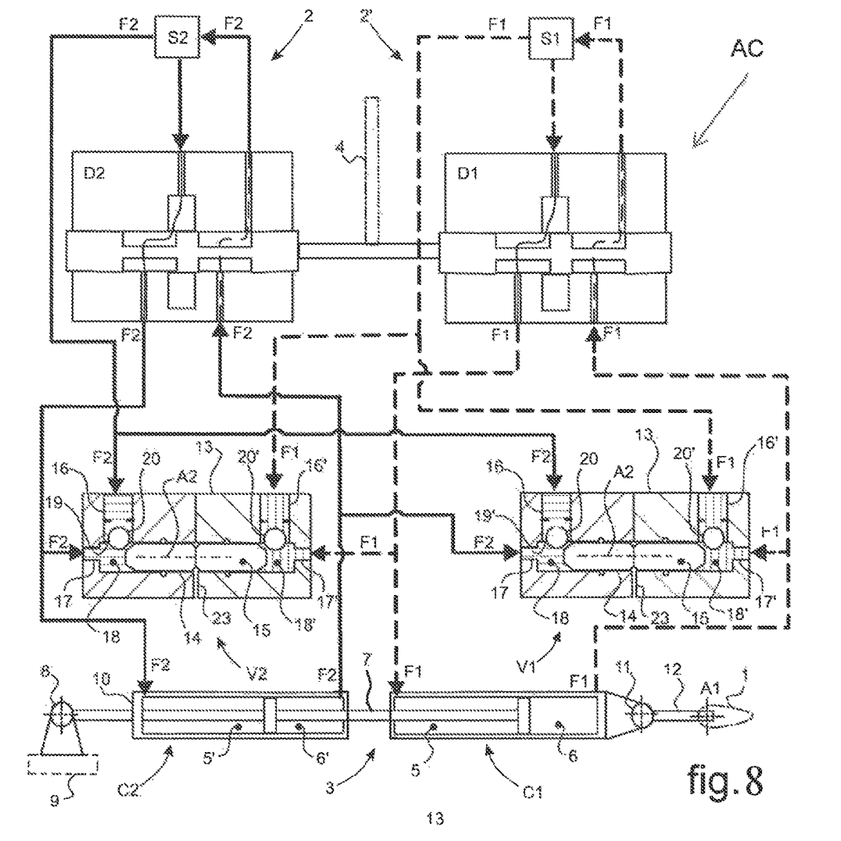
FIG. 8 shows an example of architecture for a hydraulic installation of the present invention, similar to the one of FIG. 1 but with distinct actuators formed from separated cylinders incorporated in a single servo-control having multiple actuator cylinders.

As shown in FIG. 8, the actuator cylinders C1, C2 may equally well be separate and distinct actuator cylinders 10, 10' incorporated in a single servo-control 3 having multiple actuator cylinders or actuator cylinders incorporated in servo-controls having respective single actuator cylinders.

In the configuration shown in FIG. 1 of the hydraulic installation, the operating positions of the hydraulic directional-control valves D1, D2 cause the fluids F1 and F2 to be admitted respectively into one or the other of the end chambers 5, 5' of the actuator cylinders C1, C2 via the hydraulic circuits 2, 2' respectively associated with passing flows of the fluids F1, F2 through one or other of the actuator cylinders C1, C2.

Such fluid admission causes relative movement between the rod 7 and the actuator cylinders C1, C2, and consequently causes the fluids F1, F2 to be expelled from the head chambers 6, 6' of the actuator cylinders C1, C2 towards the fluid sources S1, S2 via the hydraulic circuits 2, 2' respectively associated with passing flows of the fluids F1, F2 through one or the other of the actuator cylinders C1, C2.

Naturally, in an inverse operating configuration of the hydraulic installation, admission of the fluids F1, F2 into the head chambers 6, 6' of the actuator cylinders C1, C2 causes the fluids F1, F2 to be expelled from the end chambers 5, 5' towards the fluid sources S1, S2, as indicated by the dot-dash style arrows in FIG. 1.

The hydraulic installation also has a pair of pressure-balance valves V1, V2 placed in the respective hydraulic circuits 2 and 2'. A first pressure-balance valve V1 serves to balance the pressures of the fluids F1, F2 flowing respectively through the head chambers 6, 6' of the actuator cylinders C1, C2, and a second pressure-balance valve V2 serves to balance the pressure of the fluids F1, F2 flowing respectively through the end chambers 5, 5' of the actuator cylinders C1, C2.

In FIGS. 1 to 7, each of the pressure-balance valves V1, V2 comprises a valve cylinder 13 providing a chamber 14 for guiding movement in translation of a piston 15 along an axial extension direction A2 of the chamber 14. First ducts 16, 16' open out radially into the chamber 14, each at an axial end of the chamber 14 that is associated therewith. Second ducts 17, 17' open out to respective axial ends of the chamber 14, such that the fluids F1, F2 conveyed by the second ducts 17, 17' exert opposing axial thrusts against the piston 15 via its axial end faces.

Each of the pressure-balance valves V1, V2 has a pair of distinct fluid flow paths, each fluid flow path comprising a first duct 16 or 16' and a second duct 17 or 17' opening out into the same axial end of the chamber so as to provide a passage 18 or 18' for fluid between the first duct 16 or 16' and the second duct 17 or 17'.

In FIG. 1, the first ducts 16, 16' of each of the pressure-balance valves V1, V2 are in fluid flow communication with a respective fluid source S1, S2. Fluid flow communication between the first ducts 16, 16' and the fluid sources S1, S2 is established upstream from the hydraulic directional-control valves D1, D2 relative to a flow direction of the fluids F1, F2 from the fluid sources S1, S2 to the actuator cylinders C1, C2.

The second ducts 17, 17' of each of the pressure-balance valves V1, V2 are in fluid flow communication, respectively with the end chambers 5, 5' of the actuator cylinders C1, C2 for one of the pressure-balance valves V1, V2 and with the head chambers 6, 6' of the actuator cylinders C1, C2 for the other one of the pressure-balance valves V2, V1.

The second ducts 17, 17' are put into fluid flow communication with the chambers of the actuator cylinders C1, C2 downstream from the hydraulic directional-control valves D1, D2 relative to the flow direction of the fluids from the fluid sources S1, S2 to the actuator cylinders C1, C2.

More specifically, in FIGS. 2 to 7 and for any given pressure-balance valve V1 or V2 (only one pressure-balance valve V1 is shown in FIGS. 2 to 7), the outlet 19, 19' of each first duct 16, 16' into a chamber 14 is provided with a shutter 20, 20' preventing the fluids F1, F2 from flowing from the first duct 16, 16' to the chamber 14 under the effect of the pressure of the fluids F1, F2 conveyed from the fluid sources S1, S2 to the first ducts 16, 16'.

Furthermore, at its axial ends, the piston 15 has respective ramps 21, 21' for thrusting the shutters 20, 20' towards the insides of the first ducts 16, 16' where the shutters 20, 20' shut off respectively their outlets 19, 19' to the chamber 14.

These arrangements are such that moving the piston 15 axially inside the chamber 14 causes sliding thrust to be engaged between one or the other of the shutters 20, 20' along the associated ramp 21, 21' in the axial travel direction of the piston 15 inside the chamber 14. The effect of such sliding thrust engagement is to push the shutter 20, 20' towards the inside of the first duct 16, 16' and consequently to release, at least in part, the outlet 19, 19' from the first duct 16, 16' so that it is no longer shut by the shutter 20, 20'.

The resulting disengagement of the outlet 19, 19' of the first duct 16, 16' then allows the fluid F1, F2 admitted into the first duct 16, 16' to flow towards the second duct 17, 17' opening out into the same passage 18, 18' into which the first duct 16, 16' also opens out.

Furthermore, the passages 18, 18' arranged respectively at the axial ends of the chamber 14 are isolated from being put into fluid flow communication with each other by sealing means 22, 22'. Such sealing means 22, 22' are formed by a pair of gaskets interposed respectively between said passages 18, 18' and a bleed duct 23 opening out into the chamber 14 in an axial middle zone of the chamber 14.

It should be observed that advantage may be taken of the friction conditions between the sealing means 22, 22' and the piston 15 or the chamber 14 in order to slow down the movement of the piston 15 and thereby avoid sudden movements of the piston 15 and violent variations in the pressure of the fluids F1, F2 as admitted respectively into each of the passages 18, 18'.

Such a bleed duct 23 is constituted by a drain collecting any fluid residue that might infiltrate past the sealing means 22, 22' under the effect of repeated movements in translation of the piston 15. Such fluid residues are lost, with the lost fluid 24 collected by the bleed duct 23 being discharged to the outside of the pressure-balance valve V1, V2, since the bleed duct 23 opens out to the surrounding atmosphere.

Furthermore, the actuator cylinder 13 is preferably subdivided axially into two pressure-balance valve cylinder blocks 44, 44' that are assembled together. The blocks 44, 44' provide respective fluid flow paths and respective chamber segments lying on a common axis and making up the chamber 14.

The piston 15 is possibly formed by a one-piece unit that is guided to move axially by both of the chamber segments. Nevertheless, in the preferred embodiment as shown, the piston 15 is subdivided into two piston segments 32, 33 that bear axially against each other.

Figure 2:
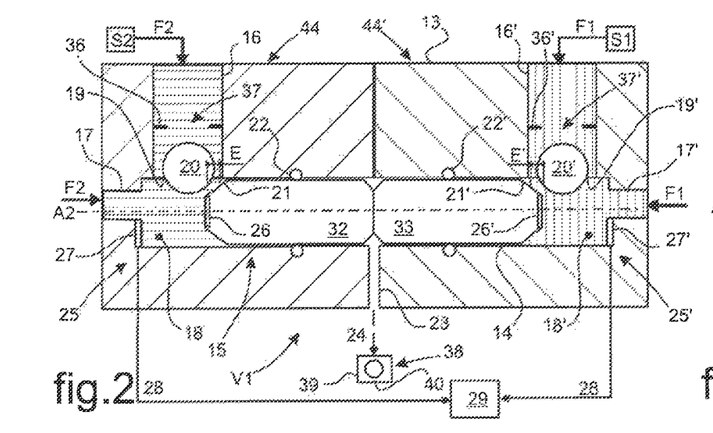
FIGS. 2 to 5 are diagrams showing a pressure-balance valve in a preferred embodiment of the present invention, showing how such a pressure-balance valve operates.
Figure 3:
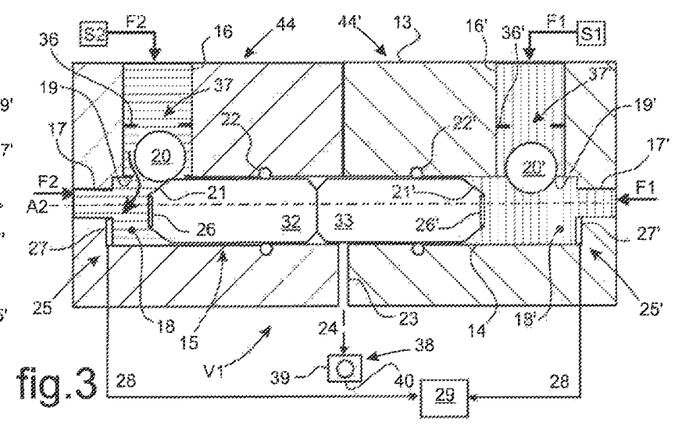

With reference to FIGS. 2 and 3 in succession, the pressure-balance valve V1 is suitable for mutually balancing the pressures of the fluids F2, F1 as conveyed respectively towards the second ducts 17, 17' and consequently makes it possible to balance the thrust forces exerted on the rod 7 by the fluids F1, F2 as admitted respectively into each of the actuator cylinders C1, C2, as shown in FIG. 1.

More particularly in FIG. 2, the piston 15 is in a stabilized axial position inside the chamber 14 under the effect of the axial thrusts exerted against the respective axial end faces of the piston 15 by the respective fluids F1 and F2 as admitted into the two second ducts 17, 17'. A stabilized axial position is obtained for the piston 15 because of the mutual balance between the pressures of the fluids F1 and F2 as admitted respectively into the two second ducts 17, 17'.

In this situation, each of the shutters 20, 20' is pressed against the corresponding outlet 19, 19' into the chamber 14 from the first duct 16, 16' that houses that shutter. Since the outlets 19, 19' of the first ducts 16, 16' are completely shut by the shutters 20, 20', it is not possible for the fluids F1, F2 that are admitted into the first ducts 16, 16' to flow towards the chamber 14.

With the piston in a stabilized position, axial gaps, E, E' are left between the ramps 21, 21' and the shutters 20, 20' that co-operate respectively with the ramps 21, 21'.

Such axial gaps E, E' make it possible, whether the piston 15 is in the stabilized position to be certain that the shutters 20, 20' are bearing in leaktight manner against the outlets 19, 19' of the first ducts 16, 16'.

Said axial gaps E, E' also make it possible to allow for an acceptable pressure difference between the fluids F1, F2 flowing respectively in the various fluid flow paths 16, 17, 18 or 16', 17', 18'. Such provisions serve to avoid continuous and inappropriate movements of the piston 15 seeking to correct small pressure differences between the fluids F1 and F2 admitted respectively into the second ducts 17, 17'.

Furthermore, the pressure-balance valve, which is designed to be installed on board the rotorcraft in an environment close to the rotor, is subjected to particularly high levels of vibration. Such vibration is likely to cause the piston 15 to oscillate randomly in its axial movement direction. Under such conditions, said axial gap E, E' serve to filter out the unwanted movements of the piston 15 caused by the vibration to which the pressure-balance valve is subjected.

As explained below, such axial gaps E, E' can also be used to advantage for braking and stabilizing the movement in translation of the piston 15 prior to sliding thrust engagement between the shutters 20, 20' and the ramps 21, 21' with which the shutters 20, 20' co-operate respectively. The shutters 20, 20' and the ramps 21, 21' are thus protected against coming into contact violently, and sustained and pointless movements of the shutters 20, 20' driven by the piston 15 are avoided.

In FIG. 3, excess pressure of the fluid F1 admitted into one of the second ducts 17, 17' compared with the pressure of the fluid F2 admitted into the other one of the second ducts 17, 17' causes the piston 15 to move in translation.

The shutter 20 in the first duct 16 situated axially opposite from the second duct 17 with excess pressure then comes into sliding thrust engagement against the ramp 21 with which the shutter 20 co-operates, thereby releasing at least in part the outlet 19 of the first duct 16 housing the shutter 20.

The first duct 16 that has its outlet 19 disengaged is then put into fluid flow communication with the chamber 14. In this situation, the fluid F2 admitted into this first duct 16 having its outlet 19 disengaged flows towards the passage 18 to which this first duct 16 leads, thereby having the effect of increasing the pressure of the fluid F2 present in this passage 18. The piston 15 is then pushed back in translation until it reaches a stabilized position when equilibrium is reestablished between these pressures of the fluids F1 and F2 respectively admitted into the second ducts 17, 17'.

In FIGS. 2 to 7, the pressure-balance valve V1 is provided with detector means 25, 25' for detecting the axial position of the piston 15 inside the chamber 14.

In the embodiments shown, such detector means 25, 25' are of the type that exchange waves within at least components 26, 26' and 27, 27' in at least one set of components installed at either of the axial ends of the chamber 14 and of the piston 15.

A first component 26, 26' is installed at one of the axial ends of the piston 15 and a second component 27 is installed at the axial end of the chamber 14 facing the axial end of the piston 15 having the first component 26, 26'. The detector means 25, 25' preferably comprise two sets of components in which the components 26, 26' and 27, 27' are placed respectively at each of the axial ends of the piston 15 and at each of the axial ends of the chamber 14.

Figure 4:
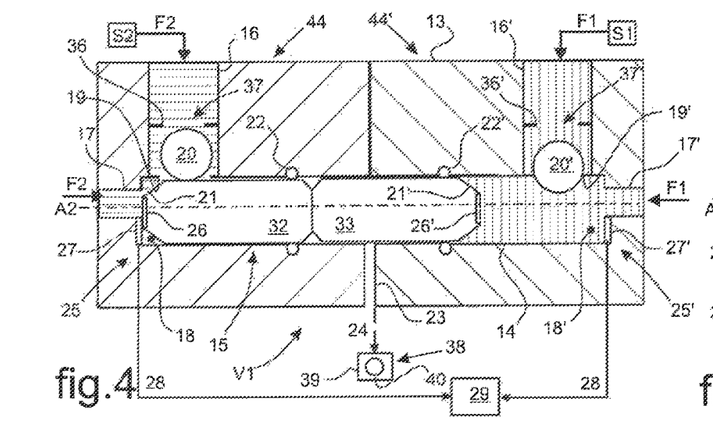

As shown in FIG. 4, an excessive stroke in translation of the piston 15 compared with a predefined acceptable stroke for the piston 15 causes a warning signal 28 to be generated as a result of co-operation between the components 26, 26' and 27, 27' of one of the sets of components.

Such a warning signal 28 is transmitted to signaling means 29 that operate an indicator light, for example, informing the pilot of the rotorcraft that there is a potential malfunction of the hydraulic installation.

More particularly, an excessive stroke of the piston 15 is indicative of potential malfunction of at least one of the hydraulic members of the hydraulic installation. An excessive stroke of the piston 15 reveals that there is an excessive pressure difference between the fluids admitted into the end chambers 5, 5' and into the head chambers 6, 6' of each of the actuator cylinders C1, C2.

As shown in FIG. 1, it should be understood that the first ducts 16, 16' of the pressure-balance valves V1, V2 are preferably in fluid flow communication with the fluid sources S1, S2 upstream from the hydraulic directional-control valves D1, D2 and that the second ducts 17, 17' of the pressure-balance valves V1, V2 are in fluid flow communication respectively with the end chambers 5, 5' or the head chambers 6, 6' of one or the other of the actuator cylinders C1, C2.

Under such conditions, the detector means 25, 25' fitted to the pressure-balance valves V1, V2 are suitable for indicting a malfunction of any one at least of the hydraulic members of the hydraulic installation, having the effect of generating a pressure difference between the fluids F1 and F2 as admitted respectively into the head chambers 6, 6' and/or into the end chambers 5, 5' of each of the actuator cylinders C1, C2.

Figure 5:
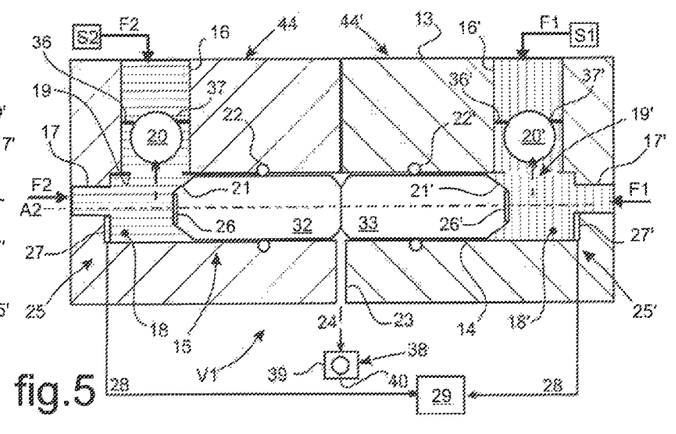
Figure 6:
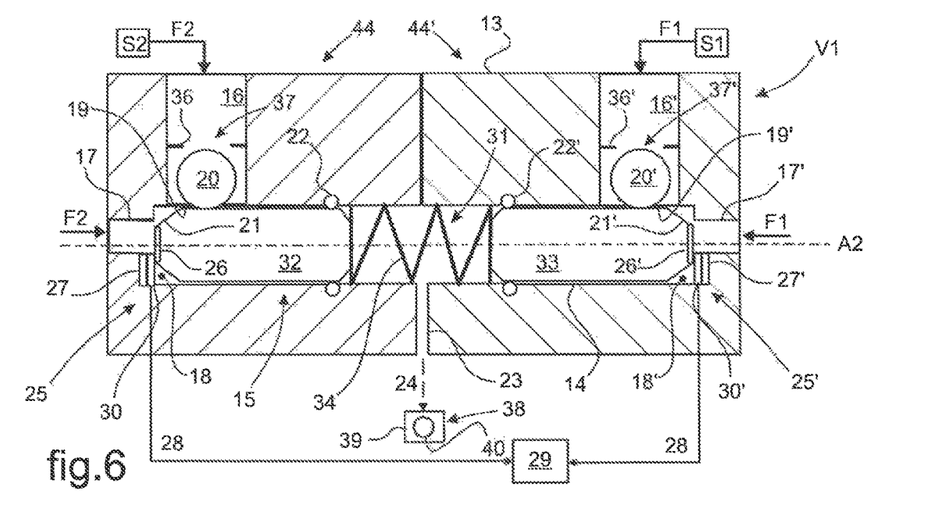
FIG. 6 is a diagram of a pressure-balance valve in a particular arrangement in accordance with the present invention.

In the embodiment shown in FIG. 6, the detector means 25, 25' comprise at least one set of components that co-operate with each other by means of the Hall effect. Each set of components has a "first" component 26, 26' installed on the piston 15, and a "second" component 27, 27' installed at the end of the chamber 14 in the manner of the embodiment shown in FIGS. 2 to 5.

The first component 26, 26' and the second component 27, 27' are formed by magnets that co-operate with each other to generate a magnetic field passing through a third component 30, 30' installed on the valve cylinder 13. The third component 30, 30' then generates a voltage from which the warning signal 28 is derived. The intensity of the warning signal 28 may vary depending on the variation in the voltage generated by the third component 30 as a function of the distance between the first component 26, 26' and the second component 27, 27' representative of the axial position of the piston 15.

Such arrangements serve to provide variable information to the pilot about the operating state of the pressure-balance valves V1 and V2 and thus about the hydraulic installation.

Furthermore, in the embodiment shown in FIG. 6, each of the pressure-balance valves V1, V2 has means for controlling the ability of the piston 15 to move axially prior to admitting the fluids F1, F2 into the insides of the pressure-balance valves V1, V2. Such control means 31 are used in particular on exit from the workshop in which a pressure-balance valve V1 is fabricated, or at least prior to the pressure-balance valve V1 being mounted in the hydraulic installation.

Said control means 31 comprise subdividing the piston 15 into two piston segments 32, 33 along its axial extent and interposing an elastically deformable member 34, e.g. arranged as a compression spring, axially between the two piston segments 32 and 33.

These provisions are such that the two piston segments 32 and 33 bear axially against each other via the elastically deformable member 34. In the absence of any admission of fluids F1, F2 into the pressure-balance valve V1, the elastically deformable member 34 pushes the piston segments 32, 33 against the respective axial ends of the chamber 14, thereby having the effect of activating the detector means 25, 25'. A warning signal 28 as then generated by the detector means 25, 25' indicates that the piston 15 made up of two piston segments 32 and 33 is suitable for moving axially without major obstacle inside the chamber 14.

Naturally, said elastically deformable member 34 is rated to deliver an axial thrust force that is just sufficient to move the piston segments 32, 33 against friction inside the chamber and in the absence of the pressure-balance valve V1 having the fluids F1, F2 fed thereto. When the pressure-balance valve V1 is fed with the fluids F1, F2, the fluids F1, F2 admitted into the passages 18, 18' urge the piston segments 32, 33 axially towards each other against the opposing forces exerted by the elastically deformable member 34 against the piston segments 32, 33.

It should thus be understood that the elastically deformable member 34 is inoperative when the pressure-balance valve V1 is installed in a chamber installation and is in use, in the sense that the elastically deformable member 34 cannot be the cause of a potential malfunction of the pressure-balance valve V1.

It should also be observed that independently of the pressure-balance valve V1 being fitted with said control means 25, 25', subdividing the piston 15 into two piston segments 32, 33 and the cylinder 13 into two cylinder blocks 44, 44' serves to prevent any cracks propagating from one of the blocks 44, 44' to the other and makes it easier to assemble the component elements of the pressure-balance valve V1 by contributing to making its structure simple.

In the embodiments shown in FIGS. 1 to 7, the shutters 20, 20' fitted to the respective outlets 19, 19' of the first ducts 16, 16' are each in the form of a sphere. For each of the first ducts 16, 16', the shutter 20, 20' is mounted to move towards the inside of the end of the first duct 16, 16' opening out into the chamber 14 between the outlet 19, 19' of the first duct 16, 16' into the chamber 14 and a perforated seat 36, 36' for retaining the shutter 20, 20' and fitted to the first duct 16, 16'.

As shown in FIG. 5, and taking a given first duct 16, 16' into consideration, the perforated seat 36, 36' has an opening 37, 37' formed therethrough, for example. The fluid F1, F2 admitted into the inside of the first duct 16, 16' is suitable for flowing through said opening 37, 37' from the first duct 16, 16' towards the chamber 14. The perforated seat 36, 36' forms an abutment for retaining the shutter 20, 20' against escaping into the inside of the first duct 16, 16'. Such an escape could potentially be caused under the effect of thrust exerted by the fluid F1, F2 present in the chamber 14 in the event of the fluid F1, F2 being at a pressure that is excessive relative to the fluid F1, F2 admitted into the first duct 16 from the corresponding fluid source S1, S2.

Such a situation might arise in the context of proper operation of the hydraulic installation. Nevertheless, under such circumstances, the operation of the pressure-balance valve V1, V2 is inhibited, which is not desired, even if inhibiting the operation of the pressure-balance valve V1, V2 does not prevent the servo-control 3 from operating correctly.

In order to avoid such a situation of the pressure-balance valve continuing to remain inhibited, pushing the shutter 20, 20' towards the perforated seat 36, 36' serves to cause the shutter 20, 20' to shut the opening 37, 37' in the perforated seat 36, 36', and consequently to prevent fluid being admitted from the first duct 16, 16' into the chamber 14.

When the pressure of the fluid F1, F2 admitted from the second duct 17, 17' towards the passage 18, 18' into which the first duct 16, 16' opens out is lower than the pressure of the fluid F1, F2 admitted to the first duct 16, 16', the shutter 20, 20' is pushed back towards the outlet 19, 19' of the first duct 16, 16' into the chamber 14 by the fluid F1, F2 admitted into the first duct 16, 16' and then flowing through the opening 37, 37' in the perforated seat 36, 36'.

Returning to FIGS. 2 to 7, the pressure-balance valve V1 is also fitted with a warning device 38 for warning of a possible malfunction of the pressure-balance valve V1 as a result of excessive wear of its sealing means 22, 22'. More particularly, the bleed duct 23 opens out to the surrounding atmosphere into a storage volume 39 that collects the lost fluid 24 picked up by the bleed duct 23.

The storage volume 39 includes means 40 for evaluating the quantity of lost fluid 24 that has been collected, e.g. formed by a window forming part of the storage volume 39. Such a window can then be used to enable an operator performing a maintenance operation to verify the operating state of the pressure-balance valve V1, and more particularly the wear state of the sealing means 22, 22'.

Figure 7:
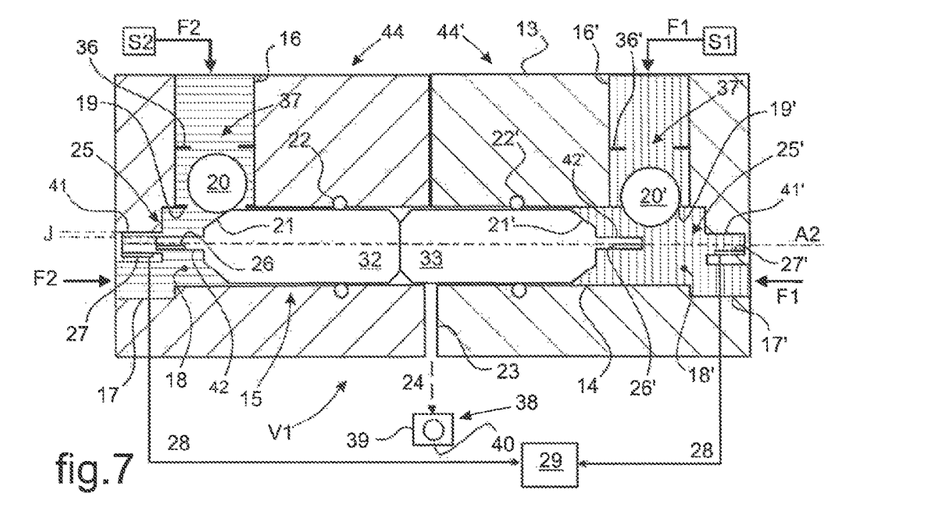
FIG. 7 is a diagram of a pressure-balance valve in another particular arrangement in accordance with the present invention.

In FIG. 7, the pressure-balance valve is preferably provided with hydraulic means for damping the movement of the piston 15 inside the chamber 14.

For this purpose, blind sockets 41, 41' are formed in the end wall at each of the axial ends of the chamber 14. Each of the sockets 41, 41' opens out at a respective end of the chamber 14. More particularly, the sockets 41, 41' open out into the fluid passages 18, 18' from which the sockets 41, 41' are fed with fluid.

The sockets 41, 41' co-operate with respective axial extensions 42, 42' of the piston 15, said extensions 42, 42' projecting axially from the respective ends of the piston 15 facing the sockets 41, 41'. More particularly, in the preferred situation where the piston 15 is subdivided into two respective piston segments 32, 33 as shown, the extensions 42, 42' are arranged respectively at the ends of the piston segments 32, 33 facing the sockets 41, 41' with which the extensions 42, 42' co-operate respectively.

In a given direction of axial movement of the piston 15 inside the chamber 14, as shown by way of example in FIG. 7, one of the extensions 42 travels inside the socket 41 with which the extension 42 co-operates. The insertion of the extension 42 into the inside of the socket 41 is braked by the fluid present in the socket 41 opposing counterthrust against the extension 42 moving inside the socket 41, and consequently opposing counterthrust against the movement of the piston 15.

As the piston 15 continues to move, the fluid present in the socket 41 is expelled progressively into the chamber 14, and more particularly into the passage 18 between the first duct 16 and the second duct 17, and consequently as the extension 42 penetrates progressively into the socket 41.

For this purpose, discharge channels are provided to enable the fluid to be discharged from the sockets 41 into the chamber 14. In the preferred example as shown and contributing to simplifying the structure of the pressure-balance valve, the channels for discharging fluid out from the socket are advantageously formed by dimensional clearance J arranged between the extension 42 and the respective socket 41 co-operating therewith.

Furthermore, in the embodiment shown in FIG. 7, the first components 26, 26' of said detector means 25 may be installed respectively on the extensions 42, 42', and the second components 27, 27' of said detector means 25 may be installed respectively on the walls defining the sockets 41, 41'.

The invention is naturally not limited to the embodiments described, but covers any technically feasible combination of their characteristics.

What is claimed is:

1. A pressure-balance valve for balancing the pressures of different fluids flowing respectively in a plurality of double-acting actuator cylinders of at least one servo-control suitable for driving a member for varying flight attitude of an aircraft, the valve including a valve cylinder comprising at least:
   a chamber for guiding a piston to move in translation along an axial extension direction of the chamber;
   two first ducts opening out into the chamber and each serving to convey a flow of a respective fluid between the outside and the inside of the valve;
   two second ducts opening out into the chamber and each serving to convey a flow of a respective fluid between the outside and the inside of the valve;
   two passages, each passage for individually conveying a flow of a respective fluid into the inside of the valve between one of the first ducts and an accompanying one of the second ducts; and
   at least one bleed duct for the draining fluids admitted into the inside of the chamber;
   wherein the pressure-balance valve has two fluid flow paths, each fluid flow path for conveying a respective fluid, each fluid flow path including a respective one of the first ducts, one of the passages, and one of the second ducts placed mutually in fluid flow communication;
   wherein for each of the fluid flow paths, the first duct is provided at its outlet to the chamber with a movable shutter that co-operates with a respective ramp formed on the piston, sliding of the shutter along the ramp caused under the effect of the piston moving in translation inside the chamber disengaging the shutter from the outlet of the first duct and consequently placing the first and second ducts in fluid flow communication with each other via the passage, the first duct and the second duct in fluid flow communication with each other delivering additional fluid through the passage from the first duct to the second duct.

2. A pressure-balance valve according to claim 1, wherein for each of the fluid flow paths, the passage is formed by an axial end segment of the chamber into which the first and second ducts open out.

3. A pressure-balance valve according to claim 1, wherein:
   the valve cylinder is subdivided into two valve cylinder blocks that are axially assembled together, the blocks providing the respective fluid flow paths by including respective chamber segments on a common axis; and
   the piston is subdivided into two structurally distinct piston segments, the piston segments being housed respectively in the chamber segments and bearing axially one against the other.

4. A pressure-balance valve according to claim 1, wherein the at least one bleed duct is arranged as a drain isolated from the fluid flow paths by seals interposed between the piston and the chamber, the bleed duct collecting lost fluid and discharging it from the valve, which lost fluid comes from any residue of respective fluids in at least one of the two fluid flow paths that has infiltrated past the seals.

5. A pressure-balance valve according to claim 4, wherein the bleed duct is common to collecting and discharging lost fluid coming from respective fluids in at least one of the two fluid flow paths.

6. A pressure-balance valve according to claim 4, wherein the seals comprise gaskets interposed axially between the bleed duct and respective axial ends of the chamber.

7. A pressure-balance valve according to claim 4, further comprising a warning device for giving a warning concerning malfunctioning of the valve by evaluating the quantity of lost fluid discharged from the bleed duct.

8. A pressure-balance valve according to claim 1, wherein the valve is configured to hydraulically damp the movement of the piston inside the chamber.

9. A pressure-balance valve according to claim 1, wherein the valve has hydraulic damper means for damping the movement of the piston inside the chamber, wherein the hydraulic damper means are formed by blind sockets opening out into respective end walls of the axial ends of the chamber and co-operating with respective axial extensions of the piston, the sockets respectively receiving the extensions as a result of the piston moving axially inside the chamber, clearance being arranged respectively between each socket and the extension co-operating therewith to leave controlled discharge channels for discharging the fluids from the sockets to the chamber.

10. A pressure-balance valve according to claim 1, wherein when the piston is in a stabilized axial position inside the chamber under the effect of balanced thrusts exerted on the axial end faces of the piston by each of the fluids respectively, axial gaps are left between the shutters and the respective ramps with which the shutters co-operate.

11. A pressure-balance valve according to claim 1, wherein the valve is configured to brake the movement of the piston inside the chamber.

12. A pressure-balance valve according to claim 1, wherein the valve includes braking means for braking the movement of the piston inside the chamber, wherein the braking means are formed by at least one of the following arrangements:
   the ramps having slopes at an angle relative to the extension axis of the piston lying in the range 5° to 60°;
   seals mounted so that they are a tight fit along the piston under the effect of the piston moving axially; and
   axial gaps are left between the shutters and the respective ramps with which the shutters co-operate.

13. A pressure-balance valve according to claim 1, wherein the valve is provided with a detector for detecting the position of the piston inside the chamber, the detector generating a warning signal in the event of detecting an axial stroke of the piston greater than a predetermined acceptable stroke.

14. A pressure-balance valve according to claim 13, wherein the detector generates a variation in the warning signal as a function of the axial position of the piston inside the chamber.

15. A pressure-balance valve according to claim 13, wherein the detector is formed by at least one set of components that co-operate by exchange of waves, the set of components comprising at least a first component placed at an axial end of the piston that is associated therewith and a second component placed at the end of the chamber facing said any axial end of the piston.

16. A pressure-balance valve according to claim 15, wherein said at least one first component may be placed equally well at either axial end face of the piston or on either of said extensions.

17. A pressure-balance valve according to claim 15, wherein the detector is of the type that make use of the Hall effect, the first component and the second component being formed by magnets that generate between them a magnetic field that is crossed by a third component mounted on the cylinder of the valve and producing a voltage that generates said warning signal at a predefined setpoint voltage.

18. A pressure-balance valve according to claim 1, wherein the shutters are bodies of revolution and wherein the ramps are arranged at respective ends of the piston.

19. A pressure-balance valve according to claim 1, wherein each of the first ducts is provided with a perforated seat for retaining the shutter with which it is associated against the shutter escaping to the inside of the first duct under the effect of thrust exerted by the fluid present in the chamber at a pressure that is higher than the pressure of the fluid admitted into the first duct.

20. A pressure-balance valve according to claim 1, wherein the valve is configured to control axial movement of the piston prior to admitting fluids into the inside of the valve.

21. A pressure-balance valve according to claim 1, wherein the valve is provided with control means for controlling axial movement of the piston prior to admitting fluids into the inside of the valve, wherein the piston is subdivided into two piston segments on a common axis bearing axially one against the other, said control means being formed by an elastically deformable member interposed axially between the piston segments and urging them towards the axial ends of the chamber respectively facing said piston segments.

22. A hydraulic installation suitable for driving a member for varying flight attitude of an aircraft, the hydraulic installation comprising two distinct hydraulic circuits preventing communication between respective fluids conveyed by the hydraulic circuits between respective fluid sources for said fluids and respective double-acting actuator cylinders of at least one servo-control suitable for driving said member for varying flight attitude of an aircraft, each hydraulic circuit including a hydraulic directional-control valve controlling the flow of the fluid through an end chamber and through a head chamber of an actuator cylinder fed with fluid under the control of the hydraulic directional-control valve of a given hydraulic circuit, the hydraulic directional-control valves being actuatable jointly under the effect of a flight control generated by a pilot of the aircraft and simultaneously controlling the flow of the various fluids inside the actuator cylinders, wherein the hydraulic installation is fitted with pressure-balance valves each in accordance with claim 1, a first pressure-balance valve balancing the respective pressures of the fluids flowing through the respective end chambers of each of the actuator cylinders and a second pressure-balance valve balancing the respective pressures of the fluids flowing through the respective head chambers of each of the actuator cylinders.

23. A hydraulic installation according to claim 22, wherein the concepts "upstream" and "downstream" are considered relative to the flow direction of the fluids from the fluid sources to the actuator cylinders; wherein the first ducts of each of the pressure-balance valves are in fluid flow communication upstream from the hydraulic directional-control valves with the respective fluid sources; wherein the second ducts of each of the pressure-balance valves are in fluid flow communication downstream from the hydraulic directional-control valves, for a first pressure-balance valve with the respective end chambers of the actuator cylinders, and for a second pressure-balance valve with the respective head chambers of the actuator cylinders; and wherein each of the pressure-balance valves opens out to the surrounding air via said at least one bleed duct with which each of the pressure-balance valves is provided.

24. A hydraulic installation according to claim 23, wherein the lost fluid collected and discharged by said at least one bleed duct of each of the pressure-balance valves is collected in a common storage volume for evaluation of the quantity of lost fluid that has been collected by the storage volume.

25. A hydraulic installation according to claim 22, wherein the actuator cylinders are distinct actuators formed from separated cylinders incorporated in a single servo-control having multiple actuator cylinders or actuator cylinders incorporated in servo-controls having respective single actuator cylinders.

26. An aircraft, wherein said aircraft includes at least a hydraulic installation according to claim 22.

27. An aircraft, wherein said aircraft includes at least: two pressure-balance valves, each pressure-balance valve according to claim 1.

* * * * *